July 16, 1968  A. H. TURNER  3,392,909

VANE POSITIONING ACTUATOR

Filed June 23, 1966  3 Sheets-Sheet 1

INVENTOR:
ALBERT H. TURNER
BY Steward & Steward
his Attorneys

INVENTOR:
ALBERT H. TURNER
BY Steward + Steward
his Attorneys

July 16, 1968 A. H. TURNER 3,392,909
VANE POSITIONING ACTUATOR
Filed June 23, 1966 3 Sheets-Sheet 3

INVENTOR:
ALBERT H. TURNER
BY Steward + Steward
his Attorneys

United States Patent Office 3,392,909
Patented July 16, 1968

3,392,909
VANE POSITIONING ACTUATOR
Albert H. Turner, East Hampton, Conn., assignor to United Aircraft Corporation, East Hartford, Conn., a corporation of Delaware
Filed June 23, 1966, Ser. No. 560,004
3 Claims. (Cl. 230—114)

ABSTRACT OF THE DISCLOSURE

A positioning actuator unit for angularly adjusting the stator vanes in the compressor section of a turbine engine through remotely controlled motive means embodied in the actuator, in which the actuator unit is adapted to be mounted externally of a partition enclosing the compressor section and to form a seal about an aperture in that partition to allow mechanical connection between a vane-positioning unison ring in the compressor section and remotely controlled motive means in the actuator unit, whereby to provide ready accessibility to the actuator unit for maintenance purposes with minimum disturbance to the overall aerodynamic efficiency of the turbine engine.

---

This invention is directed to an actuator assembly for angularly adjusting the setting of stator vanes in an axial flow high pressure turbine engine, and more particularly to an actuator assembly for simultaneously positioning the individual stator blades or vanes in a turbo compressor to obtain more efficient performance under varying conditions of engine operation.

Angular positioning of the individual stator vanes can be accomplished in several ways. One arrangement involves the use of an arm or lever fixed on the hub of each vane, with each of these arms in turn pivotally connected to an annular ring, commonly termed a unison ring. This ring is journaled for limited rotation in its plane to effect simultaneous a common angular displacement of all of the vanes in a given stage. Such arrangements are known and form no part of the present invention. This invention is concerned with the actuator means for effecting the angular displacement of the unison ring, and with improvements in design, placement on the engine and servicing of such actuators for turbine installations.

Theoretically the vane actuator could be mounted within the engine immediately adjacent the stator vanes to be angularly adjusted. For practical reasons, more especially ready access to the actuator by maintenance personnel in order to effect necessary servicing and adjustment as well as easy replacement, the motive portion of the actuator should be mounted outside the envelope of the turbine engine, and a mechanical link run from it to the unison ring. This means that an aperture must be made at some point in the wall of the engine housing in the compressor section to give access of the link to the unison ring. Whether the engine is an ordinary turbine type or of the turbofan type, this linkage must pass through a wall separating a high pressure area from a low pressure one, and arrangement must be made to prevent excessive leakage around the actuator link where it passes through the housing to avoid adverse effect upon engine performance.

It also is very important in any practical installation to maintain a minimum engine profile for aerodynamic efficiency and accordingly the actuator must be of small size and height radially of the engine, and be compatible with space available in engine housings of existing or pre-established design.

These objectives are achieved in a significantly improved manner by the actuator of the present invention. To this end, the actuator unit comprises a self-contained crank and piston unit which permits orientation for optimum space utilization and minimum mechanical connections. Engine fuel under normal operating pressure is employed as the source of motive power for the actuator and both fuel and air seals, as required, are of simple, standard design. The actuator is readily accessible for servicing and replacement by virtue of its being mounted on the external wall of the engine housing, yet permits direct connection to the unison ring push rod or link arm within a compartment of the actuator to which access is easily had by removing a cover seal. Adjustment of the amount of travel imparted to the unison ring by the actuator is effected by stops built into the actuator itself, thus removing maximum stop loads from being imposed on the linkage to the ring. These stops, moreover, are easily adjusted from outside the actuator so that it does not have to be removed to make adjustments, and the results of any adjustment and its effect on the stator vanes is immediately apparent. The actuator employs a back-to-back arrangement of double cylinders working with a double-ended piston, thus minimizing the number and complexity of sealing points in the unit.

A preferred, practical embodiment of one form of actuator device embodying the invention is illustrated in the accompanying drawings, in which FIG. 1 is a schematic view of a turbofan engine, in section on the longitudinal axis of the engine, incorporating the stator blade positioning actuator of the invention;

Figure 3:
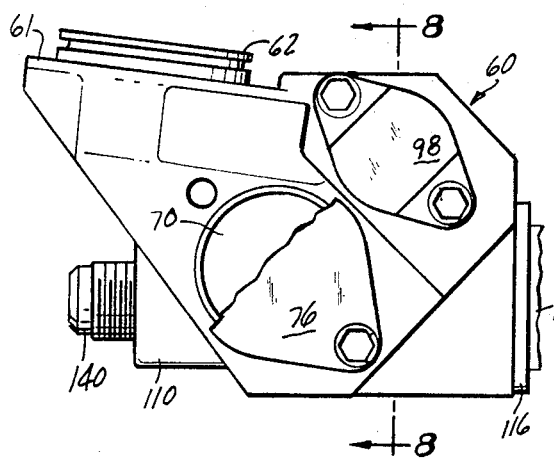
FIG. 3 is a front end view of the actuator unit, looking in the direction of the turbine axis, certain parts being broken away or omitted for clarity of illustration.
Figure 4:
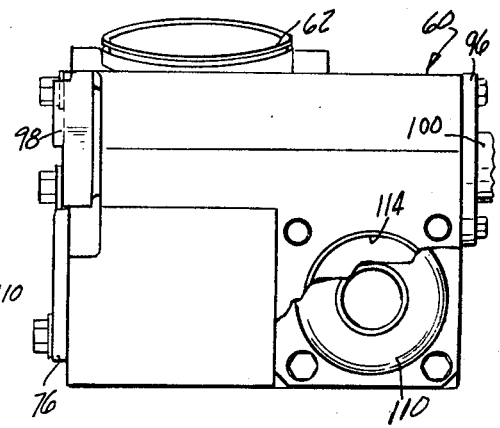
FIG. 4 is a side elevational view, looking from the right in FIG. 3.
Figure 5:
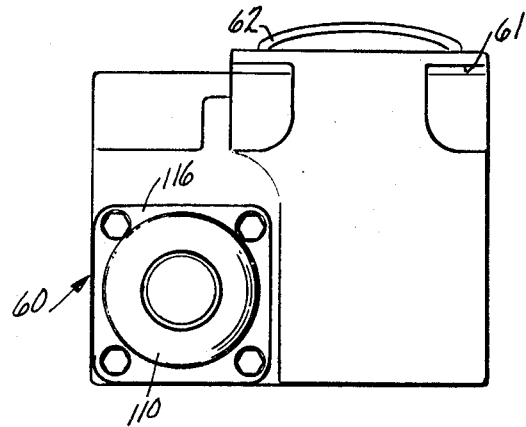
FIG. 5 is a side elevational view, looking from the left in FIG. 3.
Figure 6:
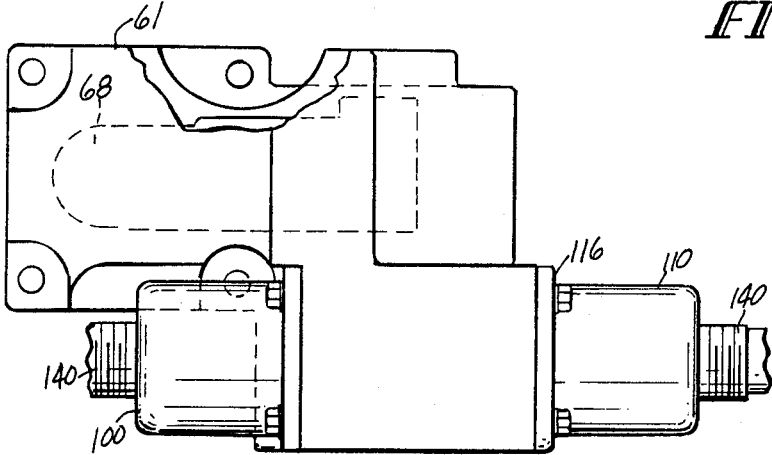
FIG. 6 is a plan view, looking at the bottom of the unit as seen in FIG. 3.
Figure 9:
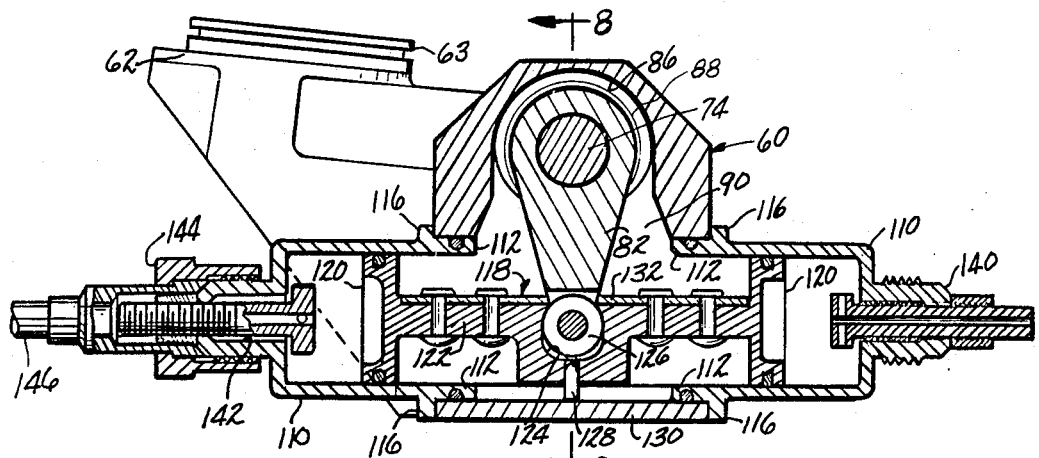
Figure 8:
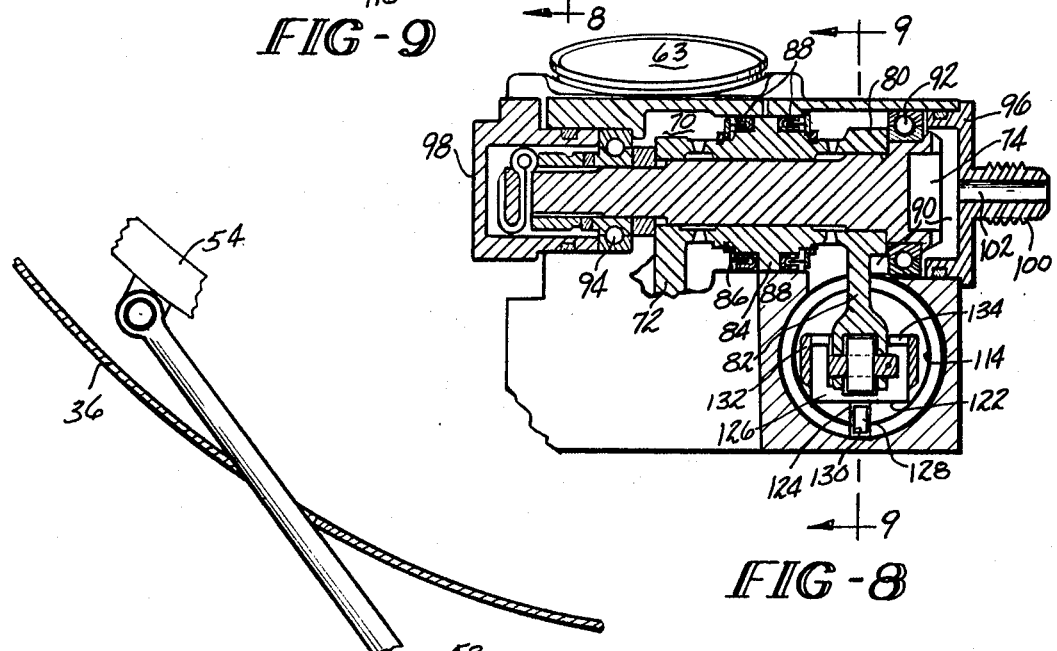
Figure 7:
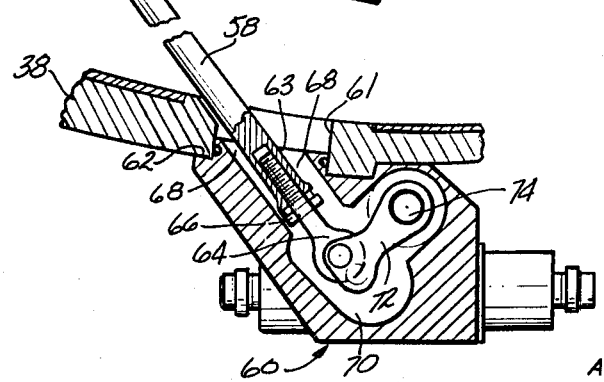
FIG. 7 is a fragmentary view in cross section of the turbine engine housing, looking along the turbine engine axis, showing a portion of the actuator in section and the mechanical link connection it to the unison ring.

FIG. 8 is a view in side elevation, as viewed in partial cross section on line 8—8 of FIG. 3 and 8; and FIG. 9 is a view in end elevation, in section on line 9—9 of FIG. 8.

Figure 1:
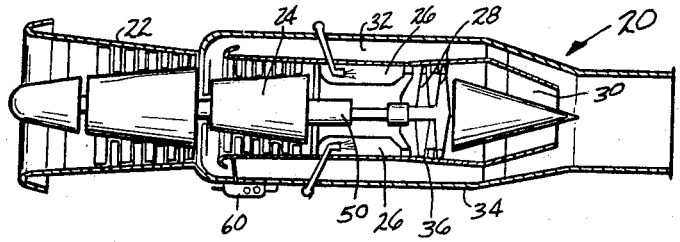

By way of introducing the description of the invention itself, reference will be made to its application to a turbofan engine, as illustrated schematically in FIG. 1. Engine 20 is conventional, comprising a turbofan section 22, a compressor section 24, combustion chambers 26, turbines 28 and exhaust section 30. An annular fan bypass duct 32 is formed between the outer engine housing or envelope 34 and the inner housing or envelope 36.

Figure 2:
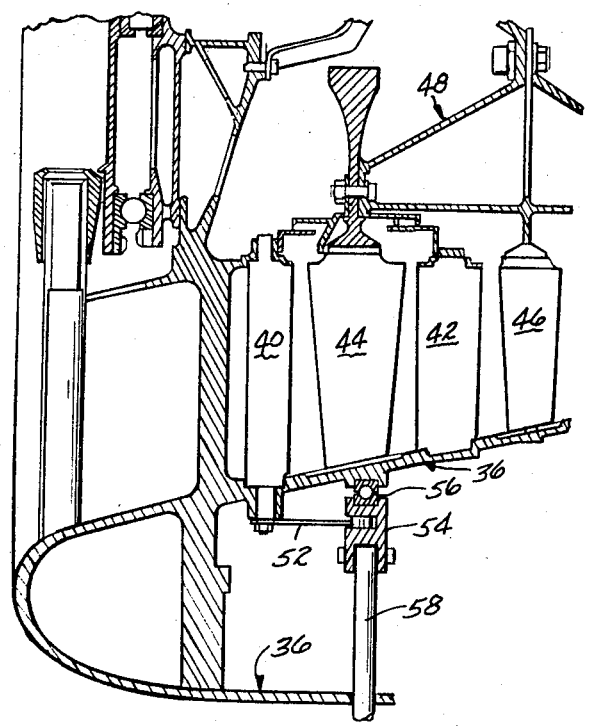
FIG. 2 is a fragmentary view in section of a portion of the compressor section of the engine seen in FIG. 1, showing one arrangement for angularly adjusting the stator blades of the first stage of the compressor.

As shown in some greater detail in FIG. 2, compressor section 24 consists of axially arranged banks or stages of stator blades 40, 42 arranged radially about the axis of the engine, in alternation with rotor blades 44, 46. The parts here shown comprise of course but a fragmentary portion of similar stages of rotor and stator blades arranged axially along the engine. As illustrated in FIG. 2, rotor blades 44, 46 are carried by a rotating hub structure 48 secured to turbine shaft 50. Stators 40, 42, in turn, are secured in stationary frame members comprising in part the inner envelope 36 of the turbine.

In order to vary the performance of the turbine engine to meet particular operating conditions, it is frequently advantageous to change the pitch or angular setting of the stator blades in one or more banks of the compressor in order to cause the air to impinge against the rotor blades at a different angle. This is commonly accomplished by pivotally supporting the opposite ends of a stator blade, for example blade 40, in a given bank so that it may be pivoted about its longitudinal axis, that is, the axis which is radial with respect to the engine shaft. To this end, each stator vane 40 has a lever arm 52 fixed to its outer end whereby angular displacement of the lever arm will result in a corresponding angular displacement of the stator vane 40 itself. A unison ring 54, seen in fragmentary cross-section in FIG. 2, is journaled on suitable bearings 56 on the frame 36. Each of arms 52 makes pivotal connection with unison ring 54 so that rotational movement of the ring produces simultaneous angular displacement of the lever arms 52 and the associated stator vanes 40 whereby all are positioned in unison in accordance with a determined operational setting. Rotational adjustment of unison ring 54 is provided through a push-pull rod 58 pivotally connected at some point on the periphery of the unison ring. As seen in FIGS. 1 and 2, push-pull rod 58 projects through the fan by-pass duct 32, a zone of high pressure, and then through the outer engine wall constituting part of envelope 34, in order to provide a point of connection to the rod which is accessible on an assembled and installed turbine engine. The problem of providing an effective seal about the push-pull rod where it passes through wall 34 is thus presented.

The invention provides a solution to this problem by mounting a remotely-controlled actuator assembly 60 on the outer envelope of the engine installation at the point of egress of the push-pull rod, the unit making a fluid-tight seal with the envelope to prevent leakage of high pressure air around the push-pull rod. Actuator unit 60 itself will now be discussed in detail.

Referring to FIGS. 1, 3, 6 and 7, actuator assembly 60 is bolted to the outer face of the wall or envelope 34 of turbofan engine 20 at a point where push-pull rod 58 passes through an aperture 61 formed in the wall for that purpose. Actuator 60 is provided with a mounting flange 62 from which a collar 63 projects for insertion into aperture 61 to form a seal therewith.

Rod 58 is tapped at its lower end and a clevis bolt 64 is threadedly received therein, being suitably locked in axially adjusted position on rod 58 by lock nuts 66. Actuator 60 is formed internally with an access passage or bore 68 terminating in collar 63 for communication with aperture 61 of the turbine housing, thereby allowing the lower end of rod 58 to project into and be confined within a chamber 70 in the body of the actuator. Within this chamber, clevis bolt 64 is pivotally attached to the free end of an arm 72 which forms part of a crank including a bolt 74 pivotally supported in unit 60. Access to chamber 70 for connecting and disconnecting crank arm 72 and clevis bolt 64, as well as for making linkage adjustment in the axial setting of clevis bolt 64 relative to rod 58, is permitted by removing an access cover or panel 76 (FIG. 3) bolted to the side of the actuator unit 60.

As seen best in FIG. 8, crank arm 72 is located at one end of a hollow sleeve or shaft 80 which is telescoped over and splined to bolt 74, as in arm 72. A second arm 82 is positioned at the other end of sleeve 80 and it also is splined to bolt 74. Intermediate arms 72 and 82, sleeve 80 is formed to provide a seal retainer including a peripheral flange 84 and spring retainer 85 for the packing seal. As here illustrated, chevron packing 88 is held in back-to-back relation on either side of the central peripheral flange 84 and making a fluid-tight rotary seal with the surface of bore 86 extending transversely through the body of the actuator. In this way, actuator 60 is divided internally into two separate, fluid-tight compartments, one being compartment 70 already mentioned in which arm 72 is located, the other being compartment 90 (FIGS. 8 and 9) which will be discussed in more detail presently and in which arm 82 of the crank is located.

Pivotal movement of crank arms 72, 82, and the associated pivot bolt 74 is provided by bearing sets 92, 94, located adjacent respectively opposite ends of the bolt and carried in chambers 90 and 70, respectively, of the actuator. Access for assembly of the components and replacement of the chevron seals is permitted through end caps 96, 98 at respectively opposite sides of actuator 60. These caps are bolted to the body of the actuator to form a fluid tight seal therewith. Cap 96 is formed with a nipple 100 providing a port 102 communicating with chamber 90 within the actuator for a purpose to be described.

Cranking motion is imparted to arm 82 by means of a double-acting piston operating in opposed cylinders secured to the actuator in back-to-back relation. Referring to FIG. 9, identical cylinders 110 are mounted on opposite faces of actuator 60, and each is provided with an inner skirt 112 which is received in a bore 114 extending through the actuator at right angles to and somewhat below bore 86. Cylinders 110 each have a mounting flange 116 by which they are bolted to the respective faces of the actuator to make a fluid tight fit therewith.

A double-ended piston assembly 118 is disposed in the actuator for reciprocating motion in cylinders 110 transversely of the actuator housing; i.e., perpendicular to the axis of pivot bolt 74. Piston 118 has a head 120 at each end interconnected by a yoke 122. Each piston head is provided with a ring to make tight sliding fit of the head within its respective cylinder. At the neck of the yoke a slot 124 is formed extending crosswise of the piston assembly and within which there is received a roller 126 pivotally mounted on the free end of crank arm 82. Reciprocal motion of piston 118 is thus translated into a cranking motion of shaft 74 by engagement of roller 126 in slot 124. In order to prevent turning of the piston within cylinders 110, and to maintain proper connection between the yoke and roller, a guide pin 128 is set into the center of the yoke at its under surface, and projects into a guide slot 130 milled in the lower face of bore 114 of the actuator housing. As illustrated in the drawings, yoke 122 is reinforced between heads 120 by a webb plate or channel 132 riveted across the arms of the yoke, a central aperture 134 being let into the plate to allow entrance of the tip of crank arm 82 and roller 126.

Each of pistons 110 is formed at its closed end with a boss 140 bored internally to provide a fluid port 142. Each boss 140 is threaded externally and is adapted to receive a gland nut 144 by which to make connection to a fluid conduit 146 to permit fluid under pressure to be directed into and out of the respective cylinders 110 through ports 142 for reciprocation of the piston.

In order to provide means for delimiting the amount of reciprocal travel of piston 118, each of ports 142 is threaded internally and an adjustment screw 148 is received therein. Screws 148 are provided with passages 150 for flow of fluid therethrough. Each screw has a head portion 152 which serves as an adjustable stop for abutment of the respective head 120 of the piston. Screws 148 are adjusted axially in their respective cylinders and then locked in position with a lock nut 154. Both the screw and the lock nut are accessible externally of the actuator unit by removing the gland nut 144 and associated conduit 146.

The actuator here illustrated is designed for use of high pressure engine fuel as the source of operating fluid for reciprocating piston 118. Fuel under pressure is supplied through a selector valve (not shown) to one or the other cylinders 110 depending on the adjustment to be made in the setting of the stator vanes. The opposite cylinder is then vented by the same selector valve to the input side of the fuel pump to allow escape of the fuel already present in that cylinder. In order to minimize leakage problems, chamber 90 in the actuator housing is continuously connected to the pump input through conduit means (not shown) connected to nipple 100. Thus any leakage that may take place across seal retainer 84 and chevron seals 88 will be from the high pressure air chamber 70 to the low pressure fuel chamber 90, which is in the safe direction.

What is claimed is:
1. A positioning actuator for variable-position vanes located in the compressor section of a turbine engine, wherein said actuator is directly mountable on the low pressure side of a wall exposed on its opposite side to compressor pressure in said engine and is connected to said variable-position stator vanes by push-pull mechanical linkage extending through an aperture in said engine wall, said actuator comprising a housing having means for mounting it on said engine wall;
an aperture in one wall of said actuator housing corresponding to said engine wall aperture, and sealing means surrounding said housing aperture to make fluid-type engagement about said engine wall aperture when said actuator is mounted on said wall;
said actuator having double-acting piston means and a crank having a first arm operatively connected at its free end to said double-acting piston, and a second arm within said actuator housing having a free end extending to a point adjacent said aperture, and means for pivotally connecting the free end of said second arm to said push-pull linkage within said actuator housing;
cylinder means received in fluid-tight engagement on said housing and enclosing said piston in fluid-tight engagement while permitting reciprocable movement thereof to actuate said push-pull linkage;
said linkage means being closed at its opposite ends and having fluid ports thereat, and means for connecting said ports respectively to a source of fluid under pressure; and
a stop member received in each of the closed ends of said cylinder means, said member being axially adjustable of said piston externally of said cylinder means to provide an interior abutment for limiting reciprocation of said piston.

2. A positioning actuator as defined in claim 1, wherein said crank is journaled within said housing with its axis oriented at right angles to the axis of reciprocation of said piston.

3. A positioning actuator as defined in claim 2, wherein said crank includes seal means intermediate its said first and second arms, said seal means forming with said housing a fluid tight partition between said arms to divide said housing into separate sealed chambers in which said arms are respectively located, said housing aperture opening into one of said chambers to give access therethrough for communication with turbine compressor pressure, and port means formed in the other of said chambers for communication with the return side of said source of fluid pressure admitted to said cylinders.

References Cited
UNITED STATES PATENTS

| | | | |
|---|---|---|---|
| 2,804,241 | 8/1957 | McDowall | 103—52 |
| 2,948,460 | 8/1960 | Zeman | 230—114 |
| 3,146,681 | 9/1964 | Sheesley | 92—13 |
| 3,196,609 | 7/1965 | Ingram | 60—262 |
| 3,199,416 | 8/1965 | Robson | 92—13 |

FOREIGN PATENTS 913,281  12/1962  Great Britain.

WILLIAM L. FREEH, *Primary Examiner.*

LAURENCE V. EFNER, *Examiner.*